United States Patent
Kagami et al.

(10) Patent No.: US 10,286,960 B2
(45) Date of Patent: May 14, 2019

(54) SUSPENSION MEMBER (71) Applicant: TOYOTA JIDOSHA KABUSHIKI KAISHA, Toyota-shi (JP)

(72) Inventors: Ayaka Kagami, Inazawa (JP); Hideaki Kanasugi, Nisshin (JP); Kazuki Shimizu, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/729,706

(22) Filed: Oct. 11, 2017

(65) Prior Publication Data
US 2018/0105213 A1    Apr. 19, 2018

(30) Foreign Application Priority Data
Oct. 19, 2016    (JP) ................. 2016-205232

(51) Int. Cl.
| B62D 25/08 | (2006.01) |
| B62D 21/11 | (2006.01) |
| B62D 21/15 | (2006.01) |
| B62D 25/20 | (2006.01) |

(52) U.S. Cl.
CPC .......... *B62D 25/2072* (2013.01); *B62D 21/11* (2013.01); *B62D 21/155* (2013.01); *B62D 25/2081* (2013.01)

(58) Field of Classification Search
CPC .... B62D 21/11; B62D 21/152; B62D 21/155; B62D 25/2072; B62D 25/2081
See application file for complete search history.

(56) References Cited

U.S. PATENT DOCUMENTS

| 4,899,843 A * | 2/1990 | Takano .................... B60K 5/12 |
| | | 180/312 |
| 5,992,926 A * | 11/1999 | Christofaro ............ B62D 21/02 |
| | | 296/204 |
| 9,937,781 B1 * | 4/2018 | Bryer ....................... B60K 1/04 |

(Continued)

FOREIGN PATENT DOCUMENTS

| JP | 4-84087 U | 7/1992 |
| JP | 08-188178 | 7/1996 |

(Continued)

OTHER PUBLICATIONS

Office Action dated Nov. 27, 2018 in Japanese Patent Application No. 2016-205232, 18 pages (submitting partial English translation only).

*Primary Examiner* — Gregory A Blankenship
(74) *Attorney, Agent, or Firm* — Oblon, McClelland, Maier & Neustadt, L.L.P.

(57) ABSTRACT

A suspension member includes: a pair of left and right front body mounts, each of which has a front side rail part extending in a front-rear direction of a vehicle body, and a cross part extending inward in a vehicle width direction; a front cross member extending in the vehicle width direction, in which both end parts of the front cross member in the vehicle width direction are joined to the cross parts, respectively; and a protective member that extends in the vehicle width direction and covers an entire lower wall of the front cross member, has a jack-up part for a jack to be applied, and is joined to the lower wall of the front cross member, the jack-up part being provided integrally in the protective member.

5 Claims, 6 Drawing Sheets

(56) References Cited

U.S. PATENT DOCUMENTS

| | | | |
|---|---|---|---|
| 2005/0275182 A1* | 12/2005 | Kurth | B62D 21/155 280/124.109 |
| 2007/0024044 A1* | 2/2007 | Ogawa | B60G 3/20 280/788 |
| 2007/0169982 A1* | 7/2007 | Ogawa | B60G 3/20 180/312 |
| 2013/0008735 A1* | 1/2013 | Hiramatsu | B60K 17/16 180/291 |
| 2013/0200656 A1* | 8/2013 | Shimmell | B62D 25/2072 296/204 |
| 2013/0285416 A1* | 10/2013 | Fukushi | B62D 21/11 296/204 |
| 2015/0061272 A1* | 3/2015 | Watanabe | B62D 21/11 280/784 |
| 2017/0008565 A1* | 1/2017 | Murata | B62D 21/11 |
| 2017/0113723 A1* | 4/2017 | Murata | B62D 21/11 |
| 2018/0105213 A1* | 4/2018 | Kagami | B62D 21/11 |
| 2018/0148100 A1* | 5/2018 | Nakagawa | B62D 21/155 |

FOREIGN PATENT DOCUMENTS

| | | |
|---|---|---|
| JP | 11-166570 A | 6/1999 |
| JP | 2004-306897 A | 11/2004 |
| JP | 2005-289115 | 10/2005 |
| JP | 2008-247120 A | 10/2008 |
| JP | 2016-78766 A | 5/2016 |
| WO | WO 2011/126084 A1 | 10/2011 |
| WO | WO 2012/043268 A1 | 4/2012 |

* cited by examiner

SUSPENSION MEMBER

INCORPORATION BY REFERENCE

The disclosure of Japanese Patent Application No. 2016-205232 filed on Oct. 19, 2016 including the specification, drawings and abstract is incorporated herein by reference in its entirety.

BACKGROUND

1. Technical Field

The disclosure relates to a suspension member.

2. Description of Related Art

A suspension member has been known, in which a jack-up part for a jack to be applied is provided in a lower central part of a front cross member (for example, see Japanese Patent Application Publication No. 2005-289115 (JP 2005-289115 A)).

SUMMARY

There are instances where a protective member is provided in a vehicle that is able to travel on bad roads. The protective member is provided in a lower part of a front cross member of a suspension member in order to restrain vehicle road interference where rocks and flying stones hit the front cross member. However, in the suspension member having the above-mentioned structure, the protective members, which are arranged on both sides of the jack-up part, need to be provided in the lower part of the front cross member, thereby causing a problem that the number of parts increases.

Therefore, the disclosure provides a suspension member that is able to restrain road interference of a front cross member without increasing the number of parts.

A suspension member according to an aspect of the disclosure includes a pair of left and right front body mounts, each of which has a front side rail part extending in a front-rear direction of a vehicle body, and a cross part extending inward in a vehicle width direction, a front cross member extending in the vehicle width direction, in which both end parts of the front cross member in the vehicle width direction are joined to the cross parts, respectively, and a protective member that extends in the vehicle width direction, covers an entire lower wall of the front cross member, has a jack-up part for a jack to be applied, and is joined to the lower wall of the front cross member. The jack-up part is provided integrally in the protective member.

According to the above aspect, the jack-up part for a jack to be applied is provided integrally in the protective member that extends in the vehicle width direction, covers the entire lower wall of the front cross member, and is joined to the lower wall of the front cross member. Therefore, compared to a case where the jack-up part and the protective member are formed separately from one another, road interference of the front cross member is restrained without increasing the number of parts.

In the foregoing aspect, both end parts of the protective member in the vehicle width direction may be joined to the lower wall of the front cross member through the cross parts, respectively.

According to the above structure, the both end parts of the protective member in the vehicle width direction are joined to the lower wall of the front cross member through the cross parts, respectively. The both end parts of the front cross member in the vehicle width direction are joined to the cross parts, respectively. Therefore, the protective member improves rigidity of the front cross member and the cross parts.

Further, in the foregoing aspect, a guide part may be provided in at least a front side of the protective member in the front-rear direction of the vehicle body and may project upward and forward in the front-rear direction of the vehicle body.

According to the above aspect, the guide part is provided in at least a front side of the protective member in the front-rear direction of the vehicle body and projects upward and forward in the front-rear direction of the vehicle body. Therefore, rocks or flying stones, etc. are guided by the guide part relatively to a lower side of the vehicle body, and road interference of the front cross member is restrained more effectively. Therefore, damage of the front cross member due to road interference is restrained.

Also, in the foregoing aspect, a rib part may be provided in the protective member along an extending direction of the protective member.

According to the above structure, the rib part is provided in the protective member along the extending direction of the protective member. Therefore, rigidity of the protective member is improved, and rigidity of the front cross member and the cross parts is further improved by the protective member.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Herein below, an embodiment of the disclosure is explained in detail based on the drawings. For convenience of explanation, in each of the drawings, an arrow UP is an upper direction of a vehicle body, an arrow FR is a front direction of the vehicle body, an arrow RH is a right direction of the vehicle body. Also, in the explanation below, upper/lower, front/rear, and left/right directions mean an upper-lower direction of the vehicle body, a front-rear direction of the vehicle body, and a left-right direction of the vehicle body (vehicle width direction), respectively, unless otherwise specified.

Figure 1:
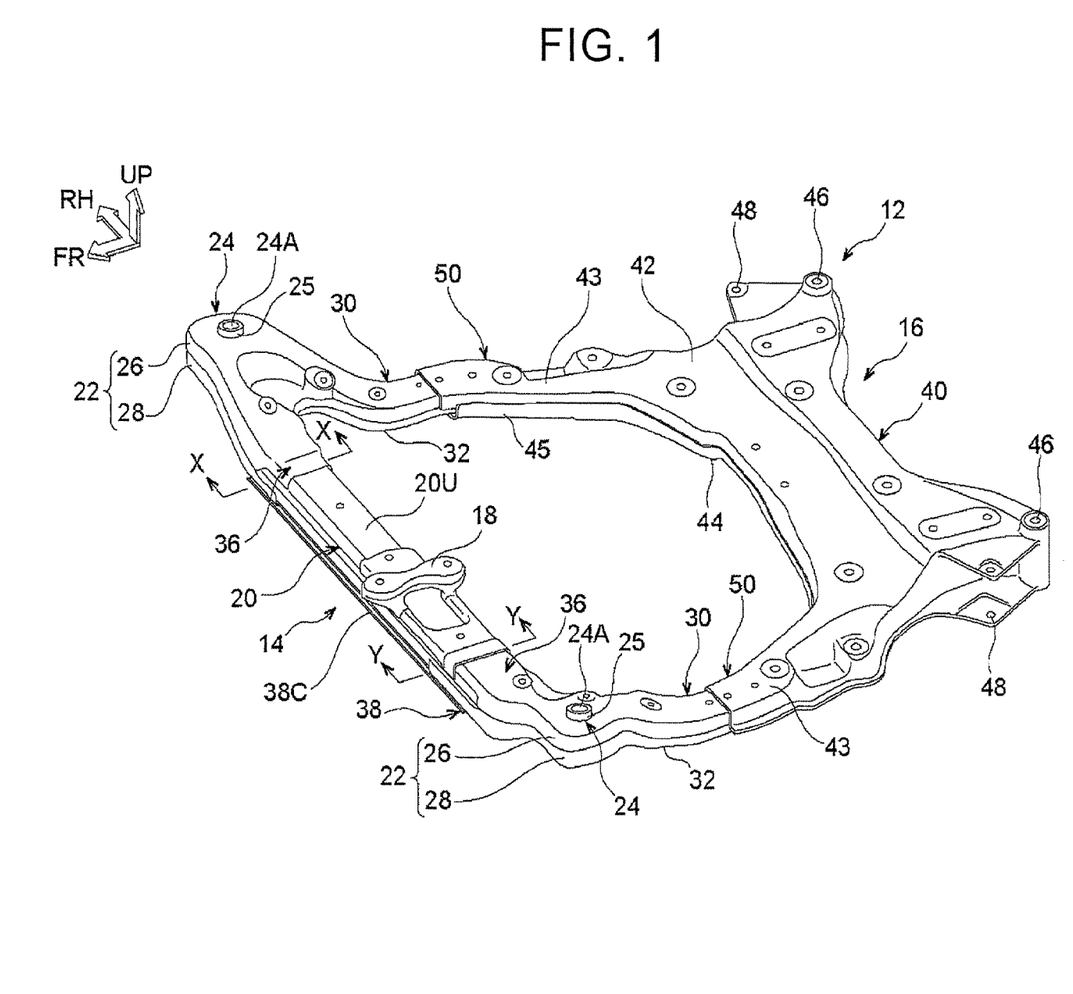
FIG. 1 is a perspective view of a suspension member according to the embodiment, seen from above.
Figure 2:
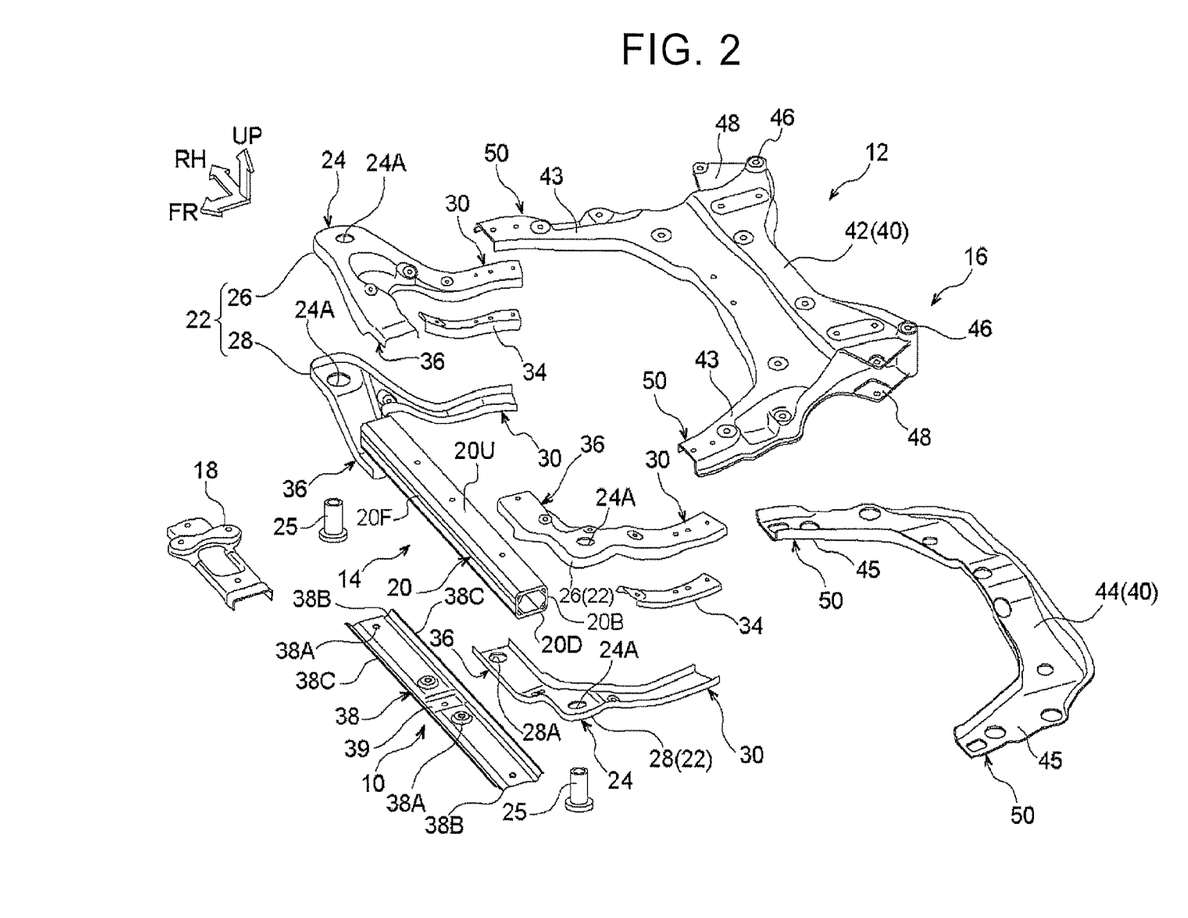
FIG. 2 is an exploded perspective view of the suspension member according to the embodiment, seen from above.
Figure 3:
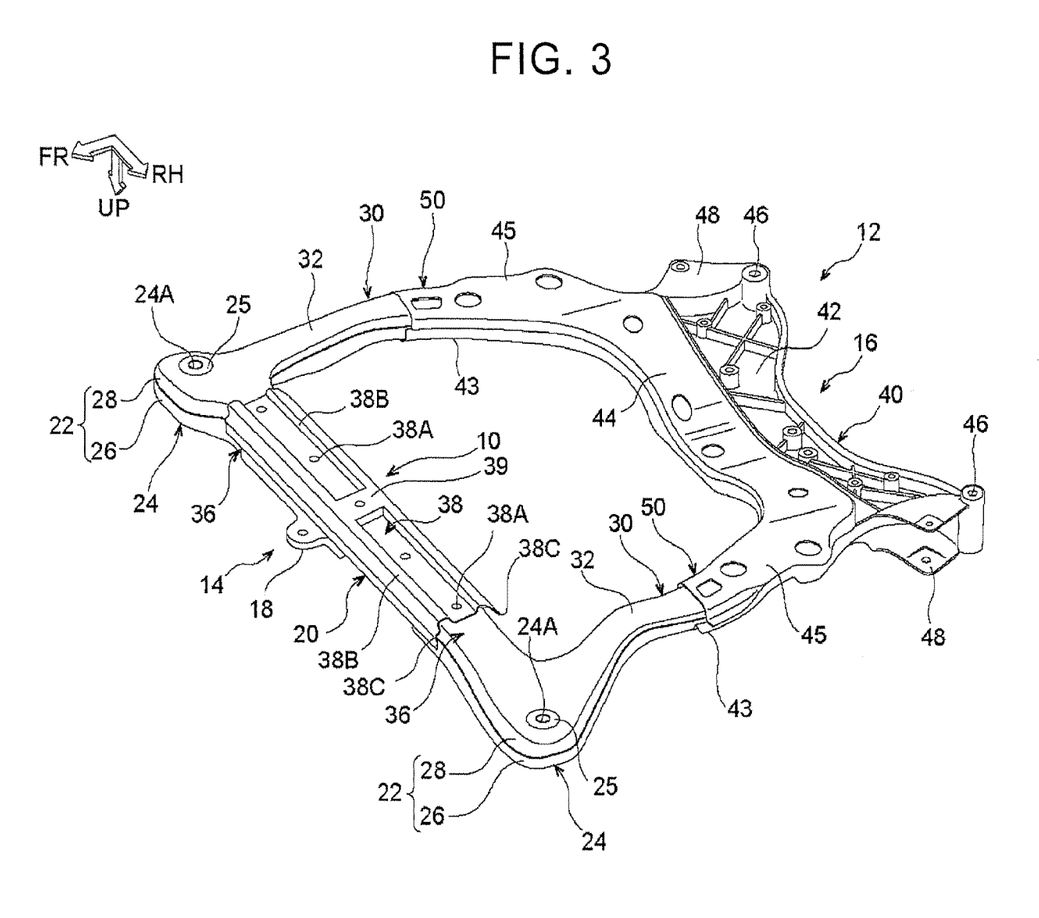
FIG. 3 is a perspective view of the suspension member according to the embodiment, seen flow below.

A suspension member 12 according to this embodiment shown in FIG. 1 to FIG. 3 is supported on a lower side of front parts of a pair of left and right front side members (not shown) extending along the front-rear direction, in a state of being suspended on the front side members. Each of the front side members has a rising part that allows the front side to be positioned higher than the rear side.

Therefore, in the suspension member 12, later-described mount parts 24 of a pair of left and right front body mounts 22, which serve as front end parts of the suspension member 12, are attached to front end parts of the front side members, respectively. The front end parts of the front side members are located on the front side of the rising parts. A later-described pair of left and right fastening parts 46 of a rear cross member 40, which serve as rear end parts of the suspension member 12, are attached to lower end parts of the rising parts.

As shown in FIG. 1 to FIG. 3, the suspension member 12 has a front frame 14 having a generally "U" shape in a plan view, and a rear frame 16 having a generally "U" shape in a plan view, which is joined to the rear side of the front frame 14. The front frame 14 includes a front cross member 20 extending in the vehicle width direction, and the pair of left and right front body mounts 22 provided in both end parts of the front cross member 20 in the vehicle width direction (an extending direction).

The front cross member 20 is formed by extrusion molding using a light metal material such as aluminum alloy into a constant rectangular closed sectional shape in a sectional view orthogonal to the vehicle width direction (the extending direction). Each of the front body mounts 22 is formed into a generally "L" shape in a plan view, by pressing a light metal material such as aluminum alloy, and includes an upper mount 26 and a lower mount 28. The upper mount 26 has an open sectional shape, in which the lower side is open, and the lower mount 28 has an open sectional shape, in which the upper side is open.

Each corner part of the pair of left and right front body mounts 22 serves as a mount part 24 that is supported by the front end part of each of the front side members, and a through-hole 24A is formed in each of the mount parts 24, penetrating the mount part 24 in the upper-lower direction. In each of the through-holes 24A, a cylindrical collar member 25 (see FIG. 2) is inserted from the lower side and attached.

Also, in each of the front body mounts 22, a part on the inner side of the mount part 24 in the vehicle width direction serves as a cross part 36 that extends to the inner side in the vehicle width direction and has a rectangular closed sectional shape. As explained later, the cross parts 36 cover both end parts of the front cross member 20 in the vehicle width direction, respectively (the both end parts of the front cross member 20 in the vehicle width direction are inserted into the cross parts 36, respectively), and are linearly bonded to the both end parts in the vehicle width direction by arc welding (see FIG. 4).

Also, an engine mount bracket 18, which is formed to have a smaller length than that of the front cross member 20, is joined by bolt fastening and arc welding to an upper wall 20U of the front cross member 20 from a generally center part to a left end part side in the vehicle width direction (the extending direction). The engine mount bracket 18 is formed by die casting of a light metal material such as aluminum alloy into an open sectional shape in which the lower side is open, and an engine mount (not shown) is attached to an upper surface side of the engine mount bracket 18.

This means that a power unit (not shown) including an engine and a transmission is arranged on the upper side of the suspension member 12, and the power unit is supported at least by the suspension member 12 and so on from the lower side through the engine mount (not shown). An installation structure of the engine mount bracket 18 is explained later in detail.

A road interference protector (herein after, simply referred to as a "protector") 38 is joined to a lower wall 20D of the front cross member 20 by bolt fastening. The protector 38 extends in the vehicle width direction and serves as a protective member that protects the entire lower wall 20D (the entire lower surface) of the front cross member 20. The protector 38 is formed by pressing a light metal material such as aluminum alloy so as to have approximately the same length as that of the front cross member 20 and a size that covers the entire lower wall 20D of the front cross member 20. A jack-up part integrated structure 10 (see FIG. 2 and FIG. 3) of the protector 38 is described later.

Parts of the front body mounts 22 on the rear side of the mount parts 24 serve as a pair of left and right front side rail parts 30 extending in the front-rear direction. Each of the front side rail parts 30 has a rectangular closed sectional shape in a sectional view orthogonal to the extending direction. A bent part 32, which is projected to the lower side (downwardly protruded) in a side view from the vehicle width direction, is formed in a generally center part of each of the front side rail parts 30 in the extending direction (the front-rear direction).

Also, a reinforcing rail part 34 (see FIG. 2) extending in the front-rear direction is provided between the front side rail part 30 of the upper mount 26 and the front side rail part 30 of the lower mount 28. The reinforcing rail part 34 is formed by pressing a light metal material such as aluminum alloy, into an open sectional shape in which the lower side is open. The reinforcing rail part 34 extends to a rear end part of the front side rail part 30 so as to reinforce the front side rail part 30 between the bent part 32 and the rear end part of the front side rail part 30.

The rear frame 16 has the rear cross member 40 extending in the vehicle width direction. The rear cross member 40 includes an upper member 42, and a lower member 44 that is provided in a lower surface side of the upper member 42 and protects the lower surface side of the upper member 42. The upper member 42 is formed by die casting of a light metal material such as aluminum alloy into an open sectional shape in which the lower side is open, and the lower member 44 is formed by pressing a light metal material such as aluminum alloy into an open sectional shape in which the upper side is open.

Fastening parts 46 are formed in rear parts of both ends of the upper member 42 in the vehicle width direction, respectively. The fastening parts 46 are attached to the lower end parts of the rising parts of the front side members, respectively. Lower arm attaching parts 48 are also formed in both end parts of the upper member 42 in the vehicle width direction, respectively, on the front side of the fastening parts 46. On the lower arm attaching parts 48, a lower arm (not shown) included in a suspension arm (not shown) is attached.

Also, a pair of left and right upper rail parts 43 extending to the front side is formed integrally with front parts of both ends of the upper member 42 in the vehicle width direction, respectively, and a pair of left and right lower rail parts 45 extending to the front side is formed integrally with front parts of both ends of the lower member 44 in the vehicle width direction, respectively. Left and right side surfaces of each of the upper rail parts 43 and left and right side surfaces of each of the lower rail parts 45 are linearly bonded to each other, respectively, by arc welding. Thus, a pair of left and right rear side rail parts 50 is structured, which has a rectangular closed sectional shape in a sectional view orthogonal to the extending direction.

A front part of each of the rear side rail parts 50 covers a rear part of each of the front side rail parts 30 (the rear part of each of the front side rail parts 30 is inserted into each of the rear side rail parts 50), and an edge of the front part of each of the rear side rail parts 50 is linearly bonded by arc welding to wall surfaces (an upper surface, a lower surface, and left and right side surfaces) of the rear part of each of the front side rail parts 30, which overlaps the edge of the front part of each of the rear side rail parts 50.

This means that each of the rear side rail parts 50 extends along each of the front side rail parts 30, and the edge of the front part of each of the upper rail parts 43 is arc-welded to the upper surface and left and right side surfaces of the rear part of the upper mount 26 included in the front side rail part 30. Also, the edge of the front part of each of the lower rail parts 45 is arc-welded to the lower surface and left and right side surfaces of the rear part of the lower mount 28 included in the front side rail part 30.

As stated above, as the front side rail parts 30 and the rear side rail parts 50 are joined to each other by arc welding through junctions, respectively, the front frame 14 and the rear frame 16 are joined to each other integrally. Thus, the suspension member 12 is formed, in which the front side rail parts 30 and the rear side rail parts 50 become continuous and extend in the front-rear direction, and the front cross member 20 and the rear cross member 40 extend in the vehicle width direction, respectively.

Next, based on FIG. 1 to FIG. 5, detailed explanation is given regarding a joining structure of the front cross member 20 and the cross part 36, an installation structure of the engine mount bracket 18 to the front cross member 20, and the jack-up part integrated structure 10 of the protector 38.

Figure 4:
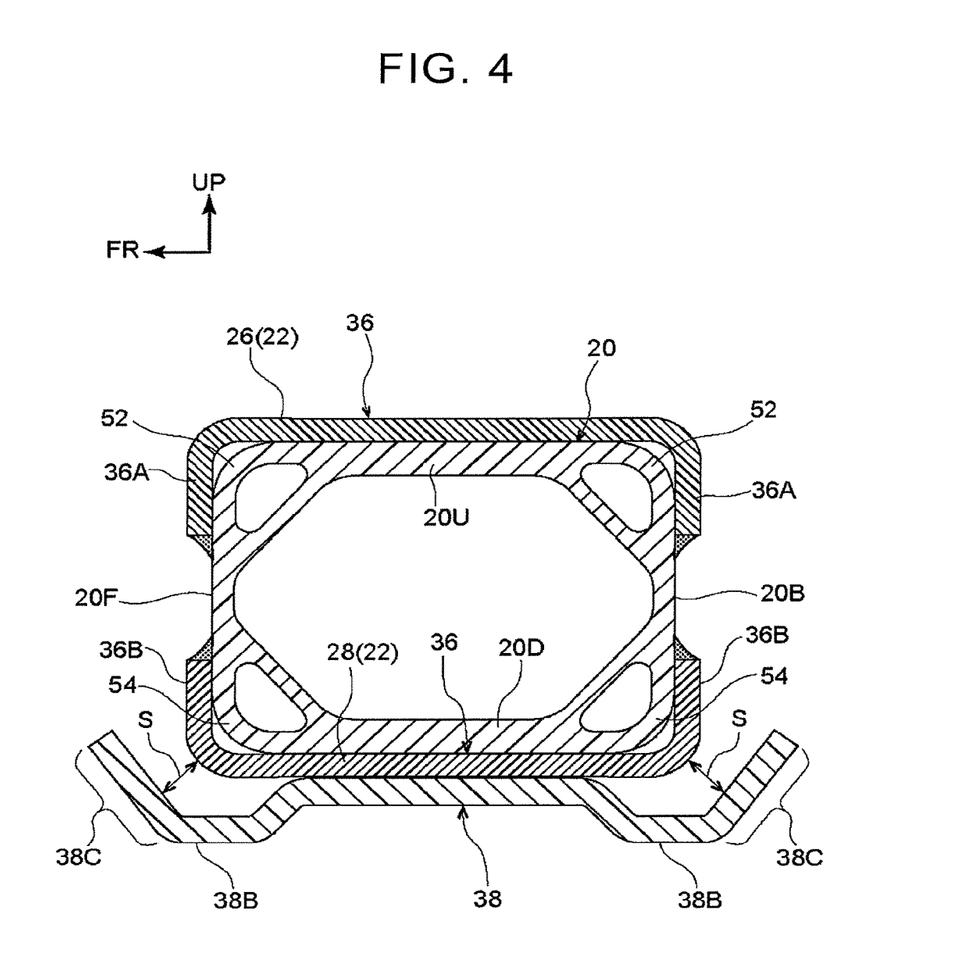
FIG. 4 is a sectional view taken along the line X-X in FIG. 1.

First of all, the joining structure of the front cross member 20 and the cross part 36 is explained. As shown in FIG. 4, front and rear upper corner parts 52 of both end parts of the front cross member 20 in the vehicle width direction are covered by front and rear flange parts 36A that are formed by bending the cross part 36 of the upper mount 26 to the lower side. Then, lower edge parts of the front and rear flange parts 36A are linearly bonded by arc welding to an outer surface of a front wall 20F and an outer surface of a rear wall 20B of the front cross member 20.

Similarly, front and rear lower corner parts 54 of both end parts of the front cross member 20 in the vehicle width direction are covered by front and rear flange parts 36B that are formed by bending the cross part 36 of the lower mount 28 to the upper side. Upper edge parts of the front and rear flange parts 36B are linearly bonded by arc welding to the outer surface of the front wall 20F and the outer surface of the rear wall 20B of the front cross member 20.

Further, an edge part of the cross part 36 in the upper mount 26 on the inner side in the vehicle width direction is linearly bonded to an outer surface of the upper wall 20U, the outer surface of the front wall 20F, and the outer surface of the rear wall 20B of the front cross member 20 by arc welding. Then, an edge part of the cross part 36 in the lower mount 28 on the inner side in the vehicle width direction is linearly bonded to an outer surface of the lower wall 20D, the outer surface of the front wall 20F, and the outer surface of the rear wall 20B of the front cross member 20 by arc welding. As a result of above, both end parts of the front cross member 20 in the vehicle width direction are joined to the cross parts 36 of the upper mount 26 and the lower mount 28.

Figure 5:
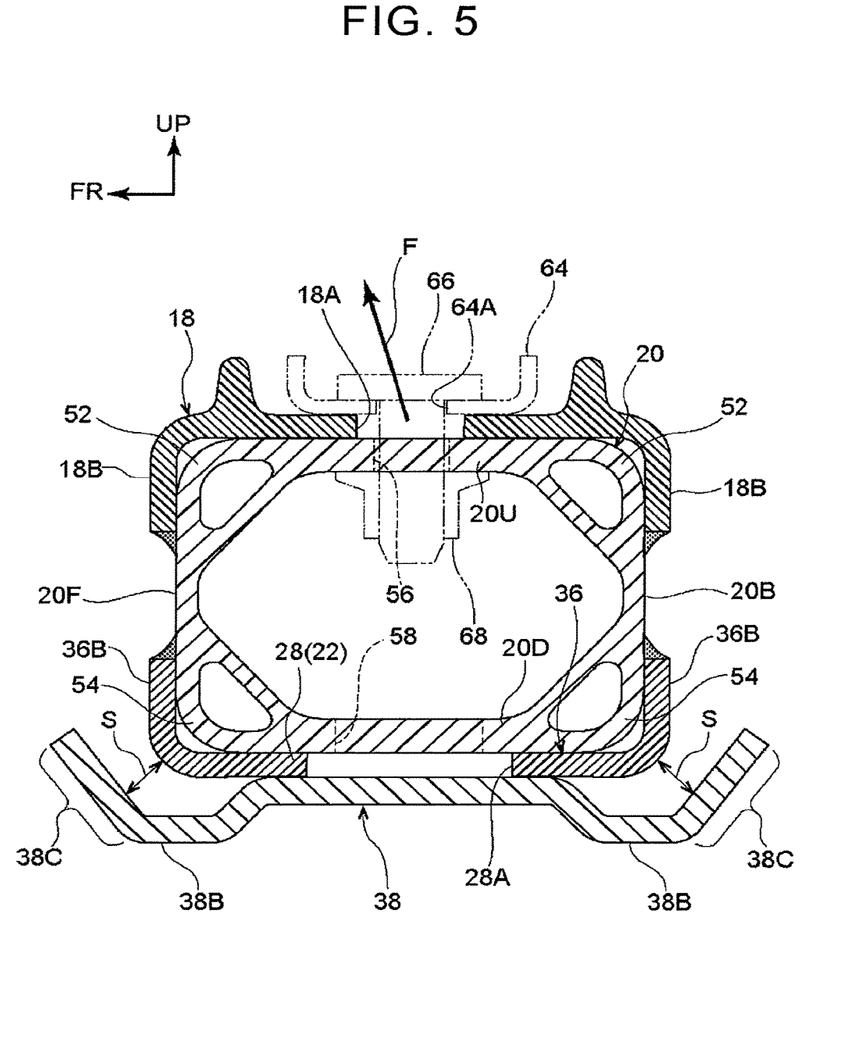
FIG. 5 is a sectional view taken along the line Y-Y in FIG. 1.

Next, the installation structure of the engine mount bracket 18 to the front cross member 20 is explained. As shown in FIG. 5, a bolt insertion hole 64A is formed in a lower end part of a support member 64, which supports the engine mount, and a bolt insertion hole 18A is also formed in the engine mount bracket 18. A bolt insertion hole 56 is formed in the upper wall 20U of the front cross member 20, and a work hole 58 is formed in the lower wall 20D of the front cross member 20. The work hole 58 is formed for allowing insertion of a tool (not shown) that is used to hold a nut 68.

Therefore, a bolt 66 is inserted in the bolt insertion holes 64A, 18A, 56 from the upper side, and screwed into the nut 68 that is held by the tool (not shown) inserted from the work hole 58 formed in the lower wall 20D, so that the nut 68 is not able to rotate. Thus, the support member 64, which supports the engine mount, is fixed to the upper wall 20U together with the engine mount bracket 18. A through-hole 28A (also see FIG. 2) for exposing the work hole 58 is also formed in the cross part 36 of the lower mount 28 on the left.

Also, as shown in FIG. 1, the left end part of the engine mount bracket 18 covers an end part of the cross part 36 of the left upper mount 26 on the inner side in the vehicle width direction. Therefore, the front and rear flange parts 18B, which are formed by bending the engine mount bracket 18 to the lower side, cover the front and rear upper corner parts 52 from the generally center part of the front cross member 20 in the vehicle width direction to the cross part 36 of the left upper mount 26.

This means that the front and rear flange parts 18B of the engine mount bracket 18 overlap the outer surface of the front wall 20F and the outer surface of the rear wall 20B of the front cross member 20. Then, the lower edge parts of the front and rear flange parts 18B are linearly bonded to the outer surface of the front wall 20F and the outer surface of the rear wall 20B of the front cross member 20 by arc welding. By the arc welding and the foregoing bolt fastening, the engine mount bracket 18 is attached to the upper wall 20U side of the front cross member 20.

Further, the cross part 36 of the left lower mount 28 extends further to the inner side than the cross part 36 of the left upper mount 26 in the vehicle width direction, and faces the engine mount bracket 18 in the upper-lower direction. Therefore, in FIG. 5, the engine mount bracket 18 is shown on the upper wall 20U side of the front cross member 20, and the cross part 36 of the lower mount 28 is shown on the lower wall 20D side of the front cross member 20.

Next, the jack-up part integrated structure 10 of the protector 38 is explained. As shown in FIG. 2 and FIG. 3, a jack-up part 39 for applying a jack (not shown) is formed integrally with a generally center part of the protector 38 in the vehicle width direction (the extending direction). The jack-up part 39 is formed so that its lower surface has a planer shape for the jack to be applied from the lower side in a favorable manner.

Also, a plurality of (for example, five including one in the jack-up part 39) bolt insertion holes 38A is formed in the protector 38 at predetermined intervals in its extending direction. A plurality of bolt insertion holes (not shown) corresponding to the bolt insertion holes 38A, respectively, is also formed in the lower wall 20D of the front cross member 20, and a bolt insertion hole (not shown), which communicates with one of the bolt insertion holes (not shown), is also formed in the cross part 36 of each of the lower mounts 28.

Further, on an inner surface of the lower wall 20D of the front cross member 20, a weld nut (not shown) is firmly fixed coaxially with each of the bolt insertion holes (not shown). Therefore, as a bolt (not shown) is inserted into each of the bolt insertion holes 38A and so on from the lower side and screwed to the weld nut, both end parts of the protector 38 in the vehicle width direction are joined to the lower wall 20D of the front cross member 20 through the cross parts 36 of the lower mounts 28, respectively, and a part of the protector 38 (including the jack-up part 39) except its both end parts in the vehicle width direction is directly joined to the lower wall 20D of the front cross member 20.

Further, as shown in FIG. 2 to FIG. 5, a pair of front and rear rib parts 38B, which extends along the extending direction of the protector 38, is formed integrally with the protector 38 except the jack-up part 39. This means that the rib parts 38B, which protrude on the lower side in a sectional view from the vehicle width direction (the sectional views shown in FIG. 4 and FIG. 5), are integrally formed by bending. The rib parts 38B are formed on the outer side of the jack-up part 39 in the vehicle width direction, and also at a given position on the front side and a given position on the rear side, which face the front and rear lower corner parts 54 of the front cross member 20, respectively, in the upper-lower direction.

Further, a pair of front and rear guide parts 38C, which projects on an upper front side and an upper rear side, respectively, is formed in the protector 38 continuously from the pair of front and rear rib parts 38B. Each of the guide parts 38C has a structure that is not in contact with the front cross member 20 and the cross part 36 of each of the lower mounts 28 (a noncontact structure).

Thus, in the sectional views in FIG. 4 and FIG. 5, each of the guide parts 38C projects at an angle at which a given space is formed from the front cross member 20 and the cross part 36 of each of the lower mounts 28 (in FIG. 4 and FIG. 5, a space from the cross part 36 is shown as "S"), and is able to deform elastically in a direction in which the space is reduced.

Explained next is effects of the suspension member 12 according to this embodiment, which is provided with the protector 38 having the above-mentioned jack-up part integrated structure 10.

As shown in FIG. 2 and FIG. 3, the jack-up part 39 is formed integrally with the generally center part of the protector 38 in the vehicle width direction. Therefore, compared to a case where the jack-up part 39 and the protector 38 are structured separately from each other, it is possible to restrain road interference of the front cross member 20 and the cross parts 36 of the lower mounts 28 (phenomena where rocks or flying stones hit the front cross member 20 and the cross parts 36) without increasing the number of parts (manufacturing cost).

Further, the guide parts 38C, one of which projects upward and forward and the other of which projects upward and rearward, are formed on the front side and the rear side so as to be continuous from the rib parts 38B of the protector 38, respectively. This means that each of the guide parts 38C projects at an angle at which the given space is formed from the front cross member 20 and the cross part 36 of each of the lower mounts 28, and is thus not in contact with the front cross member 20 and the cross part 36 of each of the lower mounts 28.

Therefore, when a vehicle is running on a bad road (not only forward but also backward), rocks or flying stones are guided to the lower side relatively and effectively by the guide parts 38C that is elastically deformable in the direction in which the foregoing space is reduced, and it is possible to restrain or prevent road interference of the front cross member 20 and the cross parts 36 of the lower mounts 28. Therefore, it is possible to restrain or prevent the front cross member 20 and the cross parts 36 of the lower mounts 28 from being damaged by road interference.

Also, as shown in FIG. 1, the engine mount bracket 18 is attached to the upper wall 20U of the front cross member 20 between the generally center part and the left end part side in the vehicle width direction (the extending direction). Then, as shown in FIG. 5, the engine mount (not shown) is attached to a right end part side of the engine mount bracket 18 through the support member 64.

Therefore, while a vehicle is running, vibration from the power unit (engine) is transmitted at least to the generally center part of the upper wall 20U of the front cross member 20 in the vehicle width direction through the engine mount and the engine mount bracket 18. This means that, due to vibration transmitted from the power unit, a load F (see FIG. 5) towards the upper direction is applied to the generally center part of the upper wall 20U of the front cross member 20 in the vehicle width direction.

However, on the lower wall 20D side of the front cross member 20, the protector 38 is joined by bolt fastening. To be more specific, both end parts of the protector 38 in the vehicle width direction are fastened by bolts to the lower wall 20D of the front cross member 20 through the cross parts 36 of the lower mounts 28, respectively, and a portion of the protector 38 (including the jack-up part 39) except the both end parts in the vehicle width direction are directly fastened by bolts to the lower wall 20D of the front cross member 20.

This means that the protector 38 is not divided into left and right sides across the jack-up part 39 and is formed continuously in the vehicle width direction, and is provided in the front cross member 20 (including the cross parts 36 of the lower mounts 28). Also, the rib parts 38B, which protrude downward, are integrally formed, along the extending direction of the protector 38, in the front side and the rear side of the protector 38 except the jack-up part 39 by bending the protector 38 except the jack-up part 39.

Therefore, the rib parts 38B are able to improve rigidity of the protector 38 itself, and the protector 38 having high rigidity is able to improve rigidity of the front cross member 20 and the cross part 36 of each of the lower mounts 28. Therefore, even when the load F towards the upper front direction is applied at least to the generally center part of the upper wall 20U of the front cross member 20 in the vehicle width direction, it is possible to restrain out-of-plane deformation of the front cross member 20 to the upper front direction.

It is possible to improve rigidity of the front cross member 20 by increasing a sectional shape of the front cross member 20. However, in this case, it becomes difficult to arrange peripheral components of the front cross member 20. It is also possible to improve rigidity of the front cross member 20 by increasing a plate thickness of the front cross member 20. However, an advantage of weight reduction of a vehicle, which is obtained by the use of a light metal material such as aluminum alloy for the front cross member 20, is lost.

With the front cross member 20 according to this embodiment, since the protector 38 improves the rigidity of the front cross member 20 efficiently, it is possible to prevent a weight increase caused by an increase of a plate thickness of the front cross member 20, and it is also not necessary to change arrangement of peripheral components. Further, since it is possible to reduce the plate thickness of the front cross member 20 to the minimum, it is possible to reduce a weight of the front cross member 20, which results in a weight reduction of a vehicle.

Further, as shown in FIG. 4, the cross parts 36 of the front body mounts 22 cover the front and rear upper corner parts 52 and the front and rear lower corner parts 54, respectively, on both end parts of the front cross member 20. Because out-of-plane deformation of the front cross member 20 in the upper front direction is restrained, the cross parts 36 of the front body mounts 22 are also restrained from having out-of-plane deformation together with the front cross member 20 in the upper front direction.

Therefore, when vibration from the power unit (engine) is transmitted at least to the generally center part of the upper wall 20U of the front cross member 20 in the vehicle width direction (when the load F towards the upper front direction is applied), it is possible to restrain or prevent the cross parts 36 of the front body mounts 22 from being separated from the outer surface of the front wall 20F and the outer surface of the rear wall 20B of the front cross member 20.

Further, since the cross parts 36 of the front body mounts 22 and the front cross member 20 are linearly joined to each other by arc welding, they are joined firmly to one another, thus restraining or preventing foreign matters from entering between them. Therefore, it is also possible to restrain and prevent electrolytic corrosion from happening between the cross parts 36 of the front body mounts 22 and the front cross member 20. This applies to linear joining between the front side rail parts 30 of the front body mounts 22 and the rear side rail parts 50 of the rear cross member 40 by arc welding.

Also, since the engine mount bracket 18 and the upper member 42 of the rear cross member 40 are formed by die casting of a light metal material of aluminum alloy and so on, it is possible to form a bearing surface, a boss, and so on for attaching other parts. This means that the engine mount bracket 18 and the upper member 42 of the rear cross member 40 are able to have a high degree of freedom in shape while having high rigidity, thereby achieving a reduction in the number of parts (rationalization of shape).

Also, since the lower arm is structured to be attached only to the upper member 42 of the rear cross member 40, it is possible to improve support stiffness of the suspension member 12 for the lower arm. Therefore, it is possible to restrain noise caused by vibration input from a front wheel (not shown) and the power unit (engine).

Figure 6:
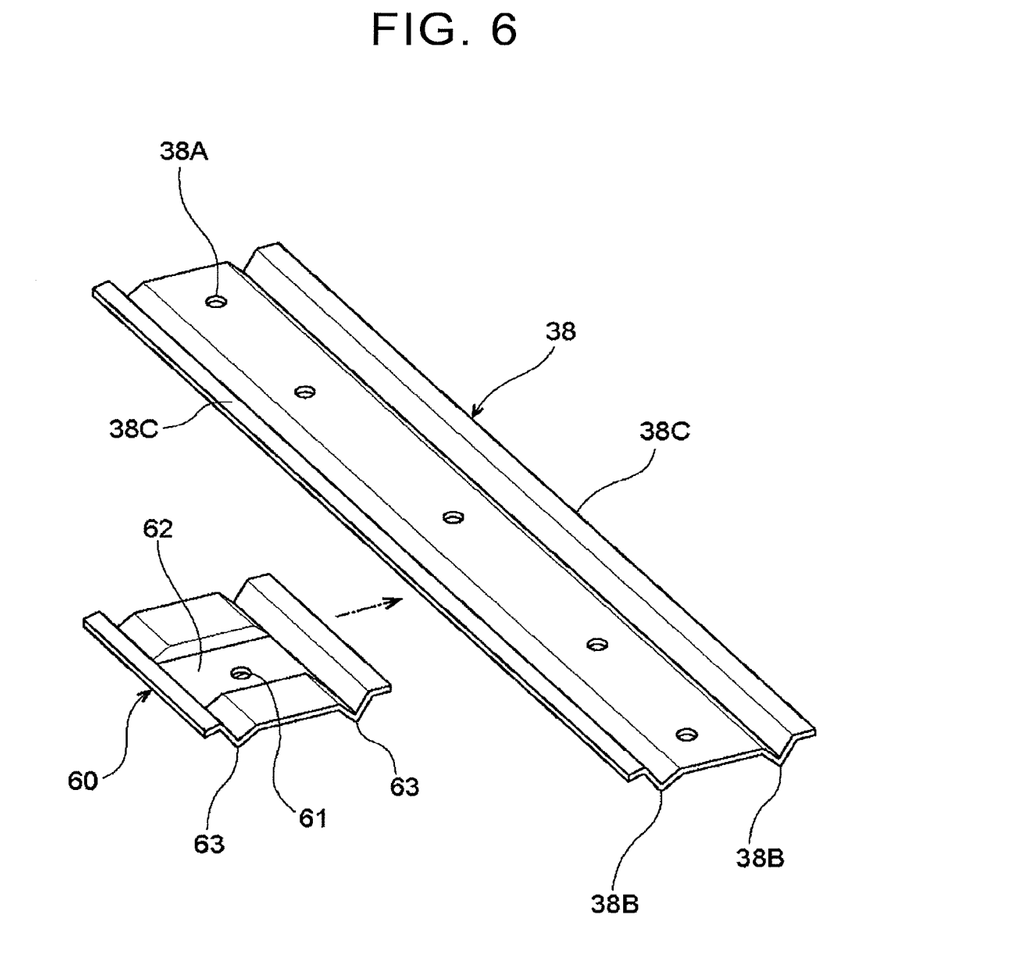
FIG. 6 is a perspective view of a modification of a protector of the suspension member according to the embodiment.

The foregoing embodiment is explained that the jack-up part 39 is formed integrally with the generally center part of the protector 38 in the vehicle width direction. However, the jack-up part integrated structure 10 of the protector 38 is not limited to this. For example, as shown in FIG. 6, the "integral joining" in this embodiment also includes integral joining of a plate 60 in advance to the lower surface of the generally center part of the protector 38 in the vehicle width direction by joining means such as spot welding or arc welding. The plate 60 has a jack-up part 62, a bolt insertion hole 61 communicating with the bolt insertion hole 38A, and rib parts 63 overlapping the rib parts 38B, respectively.

The suspension member 12 according to this embodiment has been explained so far based on the drawings. However, the suspension member 12 according to this embodiment is not limited to that shown in the drawings, and design may be changed as appropriate without departing from the gist of the invention. For example, the light metal material is not limited to aluminum alloy and may be magnesium alloy and so on.

Further, the protector 38 is joined to the lower wall 20D of the front cross member 20 by bolt fastening, but the protector 38 may also be joined by, for example, spot welding or arc welding. Further, the guide part 38C only needs to be formed at least on the front side so as to handle road interference at least when a vehicle is running forward.

Further, the front body mount 22 is not limited to the form where the front body mount 22 is made of two members, which are the upper mount 26 and the lower mount 28. The front body mount 22 may also be made of, for example, a single member as long as the cross part 36 is able to cover at least the front and rear upper corner parts 52 and the front and rear lower corner parts 54 of the front cross member 20.

This means that the front body mount 22 may be formed by extrusion molding so that the cross part 36 has a generally "C" sectional shape that continuously covers the front and rear upper corner parts 52 through the front and rear lower corner parts 54. Further, the upper mount 26 and the lower mount 28 of the front body mount 22 may be formed by die casting so as to improve rigidity.

Furthermore, the structure of the front cross member 20 is not limited to the one where the front cross member 20 is formed by extrusion molding. The front cross member 20 may also have a structure where the upper front cross member and the lower front cross member, which are formed by, for example, pressing, are joined to each other.

Also, welding for linearly joining the cross part 36 of the front body mount 22 and the front cross member 20, and welding for linearly joining the front side rail part 30 of the front body mount 22 and the rear side rail parts 50 of the rear cross member 40 are not limited to arc welding, and may be, for example, laser welding.

What is claimed is:
1. A suspension member comprising:
a pair of left and right front body mounts, each of which has a front side rail part extending in a front-rear direction of a vehicle body, and a cross part extending inward in a vehicle width direction;
a front cross member extending in the vehicle width direction, in which both end parts of the front cross member in the vehicle width direction are joined to the cross parts, respectively; and
a protective member that extends in the vehicle width direction, covers an entire lower wall of the front cross member, has a jack-up part for a jack to be applied, and is joined to the lower wall of the front cross member, the jack-up part being provided integrally in the protective member,
wherein both end parts of the protective member in the vehicle width direction are joined to the lower wall of the front cross member through the cross parts, respectively, and a part of the protective member other than the both end parts is directly joined to the lower wall of the front cross member.

2. The suspension member according to claim 1, wherein a guide part is provided in at least a front side of the protective member in the front-rear direction of the vehicle body and projects upward and forward in the front-rear direction of the vehicle body.

3. The suspension member according to claim 1, wherein a rib part is provided in the protective member along an extending direction of the protective member.

4. The suspension member according to claim 1, wherein each of the cross parts are sandwiched between one of the end parts of the protective member and the lower wall of the front cross member.

5. A suspension member comprising:
a pair of left and right front body mounts, each of which has a front side rail part extending in a front-rear direction of a vehicle body, and a cross part extending inward in a vehicle width direction;

a front cross member extending in the vehicle width direction, in which both end parts of the front cross member in the vehicle width direction are joined to the cross parts, respectively; and a protective member that extends in the vehicle width direction, covers an entire lower wall of the front cross member, has a jack-up part for a jack to be applied, and is joined to the lower wall of the front cross member, the jack-up part being provided integrally in the protective member, wherein a guide part is provided in at least a front side of the protective member in the front-rear direction of the vehicle body and projects upward and forward in the front-rear direction of the vehicle body, the guide part having a structure that is not in contact with the front cross member and the cross part.

* * * * *